Patented Jan. 7, 1941

2,227,936

UNITED STATES PATENT OFFICE 2,227,936

COATING COMPOSITION AND PROCESS OF FORMING SAME

Frederick A. Jung, Brooklyn, N. Y., and Robert R. Vallee, Philadelphia, Pa.

No Drawing. Application April 23, 1940, Serial No. 331,188

5 Claims. (Cl. 134—46)

This invention relates to improvements in surface coating compositions and in the methods of forming said compositions, the principal object of the invention being to provide a surface coating composition having certain novel and desirable properties hereinafter more fully described.

In manufacturing the surface coating composition of the present invention, there is first produced a water solution of magnesium chloride having a specific gravity of from 1.15 to 1.25 at a temperature of 25 degrees C. The magnesium chloride employed in preparing this initial solution is preferably anhydrous but hydrated magnesium chloride may be employed.

In addition to the preparation of the aforesaid magnesium chloride solution, we prepare a separate dry powdered mixture of the several materials in the approximate proportions set forth as follows:

| | Percent by weight |
|---|---|
| Silica | 24.7 |
| Calcium carbonate (marble dust) | 15.2 |
| Titanium dioxide | 4.6 |
| Barium sulphate | 9.2 |
| Calcium fluoride | 3.6 |
| Zirconium oxide | 1 |
| Magnesium oxide (calcined magnesia) | 41.7 |
| | 100.00 |

The proportions of the several materials comprising the above dry powdered mixture may be varied from those as set forth above and it is to be understood, therefore, that the stated proportions are not intended to be critical although the proportions stated have been found by experience to be productive of very good results. Also, it will be understood that the mineral filler content of the mixture which, in the above given formula, is provided jointly by the silica and marble dust, may be composed entirely of silica or entirely of the marble dust, or in lieu of one or the other or both of said mineral fillers named in the above formula, some other suitable mineral filler, such as china clay, may be employed. In any event, the total mineral filler content of the mixture will be present therein to the extent of approximately 40% thereof by weight.

Similarly, the titanium dioxide and barium sulphate may be present in the mixture jointly as set forth in the above formula or either one may be displaced entirely by the other or by some other suitable mineral opacifier such as slate dust or ferric oxide. Or, if desired, the titanium dioxide and barium sulphate may be supplemented by the additional inclusion in the mixture of a powdered mineral opacifier such as slate dust or ferric oxide.

Also, it will be understood that in the above formula for the powdered mineral mixture, the calcium fluoride may be displaced by any other alkaline earth fluoride, such as barium fluoride or strontium fluoride, or a combination of these fluorides may be employed.

It is to be noted that all of the ingredients of the powdered mixture aforesaid are water insoluble. Having prepared the dry powdered mixture as aforesaid, a suitable quantity thereof is mixed with the initially prepared magnesium chloride solution to obtain a substantially free-flowing final composition of substantially paint-like consistency, this composition being sufficiently fluid to permit the same to be applied over the surface to be coated by brushing, spraying or pouring the same thereon. In fact, the consistency of the final composition may be such as to provide an adequate coating for the surface of an object which may be dipped into the composition. For prime coatings, a desired consistency of the final composition is obtained by mixing together equal parts by volume of the magnesium chloride solution and the said powdered mineral mixture, while for finishing coats it may be preferable to employ a somewhat less fluid composition composed by mixing one part of the magnesium chloride solution with one and one-half to two parts of the dry powdered mixture by volume.

By introducing the dry powdered mixture into magnesium chloride solution, the magnesium oxide of the former reacts with the magnesium chloride of the latter to form a crystalline cement-like mass of magnesium oxy-chloride. The alkaline earth salts present in the composition, such as the strontium, barium or calcium fluoride, serve as an agent for dispersing the magnesium chloride through the composition mass to effect its uniform reaction throughout the said mass with the magnesium oxide, while the zirconium oxide facilitates this dispersion of the magnesium chloride for uniform reaction with the magnesium and at the same time renders the mass finely crystalline in structure and of increased homogeneity. The titanium dioxide and barium sulphate serve as opacifiers rendering the mass opaque. By the introduction of slate dust, ferric oxide or other such definitely colored water-insoluble minerals, any desired color may be imparted to the mass. It will be understood, of course, that the mineral aggregate or filler which is preferably composed of silica and/or marble dust, but which may include china clay or other suitable mineral fillers, is included in the composition in sufficient quantity to impart sufficient hardness and internal cohesive strength thereto.

We have found that a surface coating composition formed as described above has the highly desirable properties of strength, toughness, durability, freedom from shrinkage and a surface smoothness and texture well adapted to take a decorative coating of paint.

In the application of the composition prepared as aforesaid as a protective coating for various surfaces, such as the surfaces of cement, concrete, brick, stucco, porous fiber and asbestos boards, and like materials, the preferred practice is to brush, spray or otherwise cover said surface with a priming coating prepared as described above, this coating being allowed to dry and set for at least twenty-four hours. Thereafter, a finishing coating of the composition is applied over the said prime coating, this finishing coating preferably containing a greater proportion of the dry powdered mixture in the magnesium chloride solution than in the case of the prime coating. Following the application of the finishing coating, it sets and forms a stone-like coating which is substantially waterproof and fireproof and which resists hydrostatic pressure which, if exerted beneath the coating, would tend normally to lift the coating from the surface over which it is applied. A further characteristic of the composition which we have observed is that it expands on setting and, therefore, forms a more secure bond with porous surfaces to which it may be applied. Also, the absence of any tendency for the composition to shrink during curing prevents the formation of checks and shrinkage cracks and when the composition is applied in such manner that it is surrounded by a confining structure we have found that the expanding tendency of the composition prevents the formation of open gaps between the edges of the applied composition and its surrounding confining structure.

It will be understood that the proportions recited hereinbefore are not fixed and invariable. Instead, they may vary within reasonable limits dependent upon the properties desired in the final coating composition, the character and mesh of the mineral filler employed as the aggregate in the composition, and the character of the various other materials used in the composition. Such variations are fully within the aim and purport of this invention and it is our intention to claim all novelty inherent in the invention as broadly as the prior art permits.

What is claimed as new and useful is:

1. A free-flowing surface coating composition consisting of a magnesium chloride-magnesium oxide mixture which provides the principal cement-like mass of the composition, mineral aggregate, mineral dispersing agent selected from the group consisting of the fluorides of barium, strontium and calcium, for dispersing the magnesium chloride through the composition to effect uniform reaction therewith of the said magnesium oxide to form a mass which is adapted to subsequently harden after application and exposure into stone-like form, and a crystallizing and homogenizing agent consisting of zirconium oxide.

2. A process of forming a free-flowing surface coating composition which consists in initially preparing a solution of magnesium chloride and in thereafter adding to said solution a dry powdered water-insoluble mixture containing magnesium oxide, zirconium oxide and a mineral dispersing agent selected from the group consisting of barium fluoride, strontium fluoride and calcium fluoride for effecting uniform reaction between said magnesium chloride and magnesium oxide, said magnesium oxide being introduced in an amount sufficient to provide a magnesium chloride-magnesium oxide mixture which constitutes the principal cement-like mass of the composition.

3. A free-flowing surface coating composition consisting of magnesium chloride-magnesium oxide mixture which provides the principal cement-like constituent of the composition, mineral aggregate, mineral opacifying material, an alkaline earth dispersing agent for dispersing the magnesium chloride throughout the composition to effect uniform reaction therewith of the said magnesium oxide to form a mass which is adapted to subsequently harden after application and exposure into stone-like form, said alkaline earth dispersing agent being selected from the group consisting of barium fluoride, strontium fluoride and calcium fluoride, and zirconium oxide for rendering the composition finely crystalline in structure and of increased homogeneity.

4. A free-flowing surface coating composition consisting of a magnesium chloride-magnesium oxide mixture which provides the principal cement-like constituent of the composition, mineral aggregate selected from the group consisting of silica, calcium carbonate and kaolin, mineral opacifying material selected from the group consisting of titanium dioxide and barium sulphate, mineral dispersing material for said magnesium chloride selected from the group consisting of barium fluoride, strontium fluoride and calcium fluoride, and a homogenizing agent consisting of zirconium oxide.

5. A free-flowing surface coating composition consisting of a magnesium chloride-magnesium oxide mixture which provides the principal cement-like constituent of the composition, mineral aggregate selected from the group consisting of silica, calcium carbonate and kaolin, mineral opacifying material selected from the group consisting of titanium dioxide and barium sulphate, mineral dispersing material for said magnesium chloride selected from the group consisting of barium fluoride, strontium fluoride and calcium fluoride, and a crystallizing agent consisting of zirconium oxide.

FREDERICK A. JUNG.
ROBERT R. VALLEE.